(12) United States Patent
Kwon et al.

(10) Patent No.: US 9,539,768 B2
(45) Date of Patent: Jan. 10, 2017

(54) HIGH-SPEED STACK MOLDING APPARATUS UTILIZING ROTARY-TYPE MOULD

(71) Applicant: Research Institute of Medium & Small Shipbuilding, Busan (KR)

(72) Inventors: Yong Won Kwon, Busan (KR); Je Hyung Cho, Busan (KR); Hong Kwon Lee, Jinju-si (KR); Ho Yoon Jang, Busan (KR)

(73) Assignee: RESEARCH INSTITUTE OF MEDIUM & SMALL SHIPBUILDING, Busan (KR)

( * ) Notice: Subject to any disclaimer, the term of this patent is extended or adjusted under 35 U.S.C. 154(b) by 16 days.

(21) Appl. No.: 14/274,838

(22) Filed: May 12, 2014

(65) Prior Publication Data

US 2014/0342028 A1 Nov. 20, 2014

(30) Foreign Application Priority Data

May 16, 2013 (KR) ........................ 10-2013-0055883

(51) Int. Cl.
*B29C 70/32* (2006.01)
*B29C 70/38* (2006.01)

(52) U.S. Cl.
CPC .............. *B29C 70/32* (2013.01); *B29C 70/386* (2013.01)

(58) Field of Classification Search
CPC .......... B29C 70/30; B29C 70/32; B29C 70/38; B29C 70/386; B32B 39/00; B32B 2038/1891

USPC .................................................. 425/308, 367
See application file for complete search history.

(56) References Cited

U.S. PATENT DOCUMENTS

| | | | | |
|---|---|---|---|---|
| 3,393,918 A | * | 7/1968 | Styka ........................ | A63C 5/12 156/172 |
| 3,784,428 A | * | 1/1974 | Willats ................... | B29C 53/582 156/174 |
| 3,784,429 A | * | 1/1974 | Muller ................... | B29C 41/085 156/175 |
| 4,292,108 A | * | 9/1981 | Weiss et al. ............. | B26D 5/04 156/259 |
| 4,907,754 A | * | 3/1990 | Vaniglia .................. | B29C 53/66 156/425 |
| 5,145,543 A | * | 9/1992 | Redd et al. ........... | B29C 53/581 156/169 |

(Continued)

*Primary Examiner* — Alison L Hindenlang
*Assistant Examiner* — Jerzi H Moreno Hernandez
(74) *Attorney, Agent, or Firm* — Paratus Law Group, PLLC

(57) ABSTRACT

A high-speed stack molding device utilizing a rotary multi-mould, including a base having a moving rail formed on an upper surface thereof; a mould-rotating unit disposed on the base and supporting both ends of a multi-mould to selectively rotate the multi-mould; a movable driving frame including vertical frames extending upward from slide-coupling parts, which are moved forward and rearward along the moving rail and an upper frame connecting upper end portions of the vertical frames to cover an upper portion of the multi-mould; a fiber-reinforced resin supplying unit connected to the movable driving frame and supplying a fiber discharged from a supplying roller to the upper frame through pressure rollers; and a stacking head provided at an end portion of an articulated robot arm connected operably to the upper frame for pressurizing and stacking the fiber-reinforced resin.

5 Claims, 5 Drawing Sheets

(56) References Cited

U.S. PATENT DOCUMENTS

| | | | | |
|---|---|---|---|---|
| 5,397,415 | A * | 3/1995 | Manabe | B26D 3/08 156/234 |
| 5,433,165 | A * | 7/1995 | McGuiness | B29C 70/443 114/357 |
| 5,517,934 | A * | 5/1996 | Brown | B63B 9/06 114/357 |
| 6,029,338 | A * | 2/2000 | Heil et al. | H02K 3/51 156/169 |
| 6,096,164 | A * | 8/2000 | Benson et al. | B29C 53/602 156/425 |
| 6,514,061 | B1 * | 2/2003 | Hudson | B29C 33/305 425/182 |
| 8,206,540 | B2 * | 6/2012 | Evans | B32B 27/36 156/247 |
| 8,954,180 | B2 * | 2/2015 | Oldani | B23Q 3/15506 700/173 |
| 2005/0039843 | A1 * | 2/2005 | Johnson et al. | 156/175 |
| 2007/0039434 | A1 * | 2/2007 | DeVlieg et al. | 83/13 |
| 2008/0240634 | A1 * | 10/2008 | Laal Riahi et al. | 384/300 |
| 2009/0114337 | A1 * | 5/2009 | Llorente Gonzalez | B29C 70/32 156/185 |
| 2009/0311506 | A1 * | 12/2009 | Herbeck et al. | B29C 70/025 428/297.4 |
| 2010/0108252 | A1 * | 5/2010 | Gessler et al. | B29B 11/16 156/264 |
| 2010/0200168 | A1 * | 8/2010 | Oldani et al. | 156/441 |
| 2011/0017384 | A1 * | 1/2011 | Oriet et al. | B29C 53/66 156/175 |
| 2012/0090788 | A1 * | 4/2012 | Oldani et al. | B29C 70/384 156/441 |
| 2012/0168088 | A1 * | 7/2012 | Nakanishi et al. | 156/433 |

* cited by examiner

HIGH-SPEED STACK MOLDING APPARATUS UTILIZING ROTARY-TYPE MOULD

CROSS-REFERENCE TO RELATED APPLICATION

This application claims priority to and the benefit of Korean Patent Application No. 10-2013-55883, on May 16, 2013, the disclosure of which is incorporated herein by reference in its entirety.

BACKGROUND

1. Field of the Invention

The present invention relates to a stack molding apparatus, and more particularly, to a high-speed stack molding apparatus utilizing a rotary-type mould, in which a reinforced fiber material is stacked on a surface of the rotary-type mould utilizing the rotary-type mould to reduce processing time and enhance productivity.

2. Discussion of Related Art

In general, an article of composite materials is formed by stacking layers of materials consisting of fiber, fabric, tape, film and foil. At this time, the fiber can be made up of glass, carbon, aramid fiber, or quartz as a material. Fibers formed into a woven sheet are called "fabric" and fibers arranged in a unidirectional ribbon are called "tape."

The composite material articles are formed with various structures from a plane sheet or panel having a relatively simple configuration to a large-sized and complicated structure. At this time, the composite material article may be manufactured through a process called "fiber placement." However, the above fiber placement consists of the steps of stacking a molding material (i.e., prepreg) obtained by pre-impregnating reinforced fiber with a matrix, and heating and pressurizing it to harden the resin. At this time, according to the shape, the reinforced fiber is classified as a one-way prepreg or a cross prepreg, and a thermosetting resin such as an epoxy resin is mainly utilized as the reinforced fiber.

The above composite material article has been utilized for structural frames of aircrafts, vessels, ground effect vehicles, trains, sports equipment, blades of wind power generators, which require light weight and high strength, and the fiber placement process is typically achieved by a hand lay-up method.

At this time, the above hand lay-up method is a method in which the fiber in various fabric forms such as a woven form, a knit form and a sewn form is placed on a surface of a mould, the fiber is impregnated with a resin by means of a roller and a brush, and the fiber is dried in the air. After hardening, the fiber is separated from the mould to produce the article.

However, a conventional method is disadvantageous in that when the resin to be hardened is exposed to the atmosphere, a great deal of a volatile substance such as styrene gas is released from the resin into the air, and the volatile substance of the high concentration is bad for the operator's health.

In addition, the above conventional method can be used to manufacture one hull or a few hulls. However, since the operator stacks the composite material on a surface of the mould manually and dries it, it is impossible to mass-produce due to the time required for stacking and drying the composite material, which means that productivity is low.

Furthermore, it is difficult to impregnate the fiber material with a resin at an optimum ratio and a layer of composite material stacked on a surface of the mould does not have a uniform thickness, and thus a surface of the hull is not evenly formed. Therefore, an external three applied to an outside of the hull is concentrated on a portion having a thin thickness, which deteriorates the strength of the hull.

SUMMARY OF THE INVENTION

In order to solve the above problems, an object of the present invention is to provide a high-speed stack molding apparatus utilizing a rotary-type mould, in which a reinforced fiber material is stacked on a surface of the mould by utilizing a rotary-type mould to reduce a processing time and enhance the productivity.

In order to achieve the above object, the present invention provides a high-speed stack molding device utilizing a rotary multi-mould, including a base having a moving rail formed on an upper surface thereof; a mould-rotating unit disposed on the base and supporting both ends of a multi-mould to selectively rotate the multi-mould, the multi-mould having a plurality of hull profiles formed along an entire outer circumferential surface thereof a movable driving frame including vertical frames extending upward from slide-coupling parts, which are moved forward and rearward along the moving rail and an upper frame connecting upper end portions of the vertical frames to cover an upper portion of the multi-mould; a fiber-reinforced resin supplying unit connected to the movable driving frame and supplying a fiber discharged from a supplying roller to the upper frame through pressure rollers, the pressure rollers facing each other and disposed to allow the fiber to pass through a resin-dipping part; and a stacking head provided at an end portion of an articulated robot arm connected operably to the upper frame for pressurizing and stacking the fiber-reinforced resin, which is supplied through the fiber-reinforced resin supplying unit, on an outer surface of the multi-mould.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

A high-speed stack molding apparatus utilizing a rotary-type mould according to a preferred embodiment of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

A high-speed stack molding apparatus is all apparatus for applying and stacking a resin-impregnated fiber along a surface of a multi-mould and drying it to mold a fiber-reinforced resin having a shape corresponding to that of the multi-mould.

Figure 1:
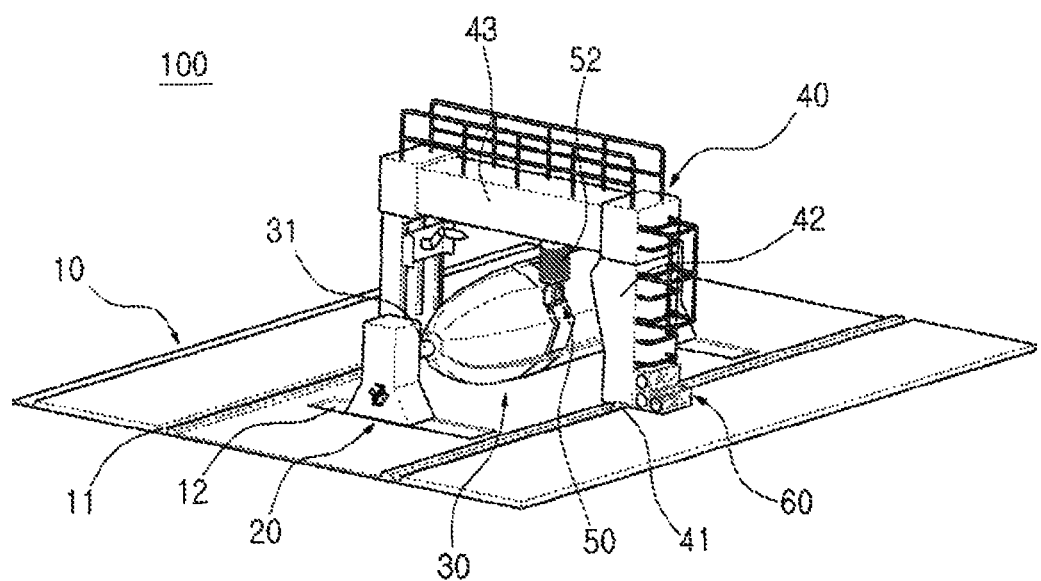
FIG. 1 is a perspective view of a high-speed stack molding apparatus utilizing a rotary-type mould according to one embodiment of the present invention.

FIG. 1 is a perspective view of a high-speed stack molding apparatus a utilizing a rotary-type mould according to one embodiment of the present invention.

As shown in FIG. 1, the high-speed stack molding apparatus 100 utilizing a rotary-type mould according to the present invention includes a base 10, mould-rotating units 20 a multi-mould 30 a forward/rearward transferring means, a fiber-reinforced resin supplying unit 60 and a stacking head 50.

Here, in the high-speed stack molding apparatus 100, a resin-impregnated fiber is supplied through the fiber-reinforced resin supplying unit 60 and the supplied fiber is stacked on an outer circumferential surface of the multi-mould 30 through the stacking head 50.

More specifically, when the multi-mould 30 coupled to the mould-rotating units 20 is rotated, the stacking head 50 stacks the fiber on an outer circumferential surface of the multi-mould 30 in the circumferential direction. The stacking head 50 is provided at an end portion of a robot arm 52, and the stacking head corresponds to and comes in contact with an outer circumferential surface profile of the multi-mould 30 to stack the fiber-reinforced resin. At this time, an articulated robot arm formed of five (5) axes is preferably utilized as the robot arm 52.

Meanwhile, a movable driving frame 40 for selectively moving the robot arm, on one end portion of which the stacking head is provided, forward/rearward may be provided as the forward/rearward transferring means. In other words, a moving rail 11 is provided on an upper surface of the base 10, and the articulated robot arm 52 is connected to the movable driving frame 40 which is moved forward/rearward along the moving rail 11. Therefore, while the articulated robot arm 52 is moved forward/rearward together with the movable driving frame, the stacking head 50 can stack the resin-impregnated fiber on the entire outer circumferential surface of the multi-mould 30. Here, it is preferable that an upper surface of the base 10 be formed as a flat surface which allows the movable driving frame 40 and the mould-rotating units 20 to be safely placed and supported thereon.

In addition, a pair of moving rails 11 are provided at both sides of an upper surface of the base 10 to enable the movable driving frame 40 coupled with the moving rails 11 to be moved forward/rearward.

An internal space is formed below an upper surface of the base 10, and an electric wiring for supplying the power required for operating the movable driving frame 40 and the mould-rotating units 20 is provided in the internal space.

Of course, it is preferable that a clamping device and a conveyer belt be further provided on the base 10. Here, the clamping device picks up a molded hull or a molded aircraft fuselage after completing a process for stacking and molding the fiber-reinforced resin on an outer circumferential surface of the multi-mould 30. Then, the conveyer belt conveys the molded article transferred by the clamping device to the next process. In addition, it is possible to further provide an air purifying device for sucking and removing a volatile material such as styrene gas generated when the fiber-reinforced resin hardens.

Meanwhile, the mould-rotating units 20 are disposed on the base 10 in a space between the moving rails 11 at both ends of the multi-mould 30. At this time, the mould-rotating units 20 support both ends of the multi-mould 30. Also, a distance between the mould-rotating units 20 may be preset such that this distance corresponds to a length of the length of the multi-mould 30.

Specifically, both ends of the multi-mould 30 are supported by the mould-rotating units 20 and connected to each other by a rotational shaft 31. At this time, the mould-rotating units 20 are provided with a driving motor for rotating the rotational shaft 31, and the electric wiring is connected to the driving motor to allow the rotational shaft 31 to be selectively rotated by driving the driving motor. Here, the multi-mould 30 is rotated integrally with the rotational shaft 31.

In addition, in order to enable the resin-impregnated fiber to be stably stacked on a surface of the multi-mould 30 by the stacking head 50, it is preferable that the mould-rotating units 20 be rotated at a pre-set rotation velocity. Therefore, the stacking head 50 can supply and stack the fiber along the circumferential direction of the multi-mould 30.

Of course, s preferable that the above pre-set rotation velocity be set based on possible working hours determined by properties of a resin and a hardening agent.

Also, the mould-rotating units 20 may be moved in a lateral direction along a moving rail 12 provided in the widthwise direction of the base 10. At this time, each of the mould-rotating units 20 can move in the same direction along the moving rails 12 to adjust a location at the multi-mould 30 is disposed, or may move in opposite directions to adjust an alignment angle of the multi-mould 30.

For this reason, the present invention is advantageous in that rotation corresponding to a shape of the multi-mould 30 is provided to enable the fiber-reinforced resin supplied from the stacking head 50 to come in close contact accurately with an outer circumferential surface of the multi-mould 30.

Meanwhile, the plurality of hull profiles are formed throughout the outer circumferential surface of the multi-mould 30. More precisely, the hull profile is an outer surface profile of a structure constituting a hull of a vessel or an aircraft body, and the hull profiles may differ from each other. In other words, if the fiber-reinforced resin is stacked and molded on the outer circumferential surface of the multi-mould 30, a structure of a hull of a vessel or an aircraft body is formed on an outer circumferential surface of the multi-mould according to the hull profile.

Here, a plurality of hull profiles facing each other may be arranged on a surface of the multi-mould 30. At this time, a plurality of hull profiles may be symmetrically disposed along a longitudinal central surface of the multi-mould 30 or may be symmetrically disposed along a vertical central surface of the multi-mould.

Thus, once the fiber-reinforced resin is stacked and hardens on an entire outer circumferential surface of the multi-mould 30, the fiber-reinforced resin is cut along facing surfaces of the plurality of hull profiles to produce a plurality of structures each having the hull profile. As a result, the productivity of an article can be significantly enhanced. Of course, the facing surfaces of the plurality of hull profiles may have shapes other than the symmetric shapes shown above as long as the profiles have the same facing surfaces.

Meanwhile, the movable driving frame 40 includes slide-coupling parts 41, vertical frames 42 and an upper frame 43.

Here, the slide-coupling parts 41 are coupled to the moving rails 11 and are moved forward/rearward in the longitudinal direction of the base 10 along the moving rails 11. At this time, it is preferable that the number of the slide-coupling parts 41 correspond to that of the moving rails 11. A driving wheel coupled to the moving rail 11 may be provided on a lower surface of the slide-coupling part 41 to allow the slide-coupling part to be slidably moved.

In addition, each vertical frame 42 is connected to the slide-coupling part 41 and extends upward. At this time, an upper end portion of each vertical frame 42 is connected to the upper frame 43 to cover an upper portion of the multi-mould 30.

Specifically, it is preferable that the vertical frame 42 have a height larger than that of the outermost portion of the multi-mould 30 coupled to the mould-rotating units 20. Thereby, the upper frame 43 connecting upper end portions of the vertical frames 42 is disposed above the multi-mould 30.

For this reason, as the movable driving frame 40 is moved forward/rearward along the moving rail 11, the stacking head 50 connected to the upper frame 43 can be moved in the longitudinal direction of the multi-mould 30.

That is, the stacking head 50 supplies the fiber-reinforced resin to the entire outer circumferential surface of the multi-mould 30 through forward/rearward movement of the movable driving frame 40 and the rotation of the multi-mould 30.

Like this, when the stacking head 50 is in close contact with an outer circumferential surface of the multi-mould 30, the multi-mould 30 is rotated and the movable driving frame 40 is moved forward/rearward. Therefore, the fiber-reinforced resin supplied through the stacking head 50 is stacked on the outer circumferential surface of the multi-mould 30 in the form of a spiral shape. Thus, the fiber-reinforced resin can be stacked with a constant thickness to improve a quality of the molded article.

In addition, the fiber-reinforced resin supplying unit 60 is connected to the movable driving frame 40 to supply the resin-impregnated fiber to the stacking head 50.

Meanwhile, the stacking head 50 is provided at an end portion of the articulated robot arm 52 connected to the upper frame 43 to pressurize and stack the fiber-reinforced resin, which is supplied through the fiber-reinforced resin supplying unit 60, to an outer surface of the multi-mould 30.

Here, the articulated robot arm 52 consists of a plurality of rotational axes to allow hinge rotation and circumferential rotation to be independently carried out, and the stacking head 50 is coupled to an end portion of the articulated robot. The above end portion can be freely moved along the surface profile multi-mould 30 according to various combination of rotation of the rotational axes, each being independently rotated.

Specifically, a step motor is provided at each rotational shaft for driving the driving shaft. At this time, this step motor may be controlled in a digital pulse manner. In other words, in response to every digital pulse which is input, the step motor performs an accurate rotational motion at a rotational angle corresponding to each step. Also, the step motor can perform continuous movement that is accurately proportional to the number of input pulses and a pulse input rate per unit time. In addition, an encoder, which is connected by a signal to a control unit controlling the articulated robot arm 52, is connected to each step motor, and a rotating direction and a rotation velocity of the step motor may be controlled according to the digital signal of the encoder. Therefore, a position of an end portion of the articulated robot arm 52 can be precisely adjusted by a combination of rotation of the rotational axes.

Through this, it is preferable that a control unit control the robot arm 52 to allow the robot arm to be selectively moved in the vertical direction or one inclined direction so that the stacking head 50 evenly contacts an outer circumferential surface of the multi-mould 30 according to the pre-set outer circumferential surface profile of the multi-mould 30.

At this time, the control unit can transmit a control command through the encoder to enable the stacking head 50 to be moved along a stacking path, which is already stored according to the shape information of the multi-mould 30, to stack the fiber-reinforced resin. Furthermore, the control unit can receive a manual control operation from an operator, convert it into a corresponding signal and then transmit this signal to the encoder.

In order to obtain precise contact between the stacking head and an outer circumferential surface of the multi-mould, the control unit can also detect the degree of contact between the stacking head 50 and an outer circumferential surface of the multi-mould 30 through a contact sensor provided on the stacking head 50 and control cooperation of the articulated robot arm 52 and the movable driving frame 40.

At this time, according to movement of the articulated robot arm 52 as described above, the stacking head 50 supplies the fiber-reinforced resin, which is supplied through the fiber-reinforced resin supplying unit 60, to an outer circumferential surface of the multi-mould 30. The supplied fiber-reinforced resin is pressurized, stacked and molded by the stacking head 50.

In this way, the fiber-reinforced resin can be accurately stacked and molded through the stacking head 50, which is moved by the articulated robot arm 52, to match an outer circumferential surface profile of the multi-mould 30. Therefore, regardless of the proficiency of worker, it is possible to form a uniform surface of the stacked and molded article to enhance a quality of the molded article. In addition, it is possible to prevent a worker from being exposed to a volatile gas generated at the time of drying the resin so that a working environment can be significantly improved.

Figure 2:
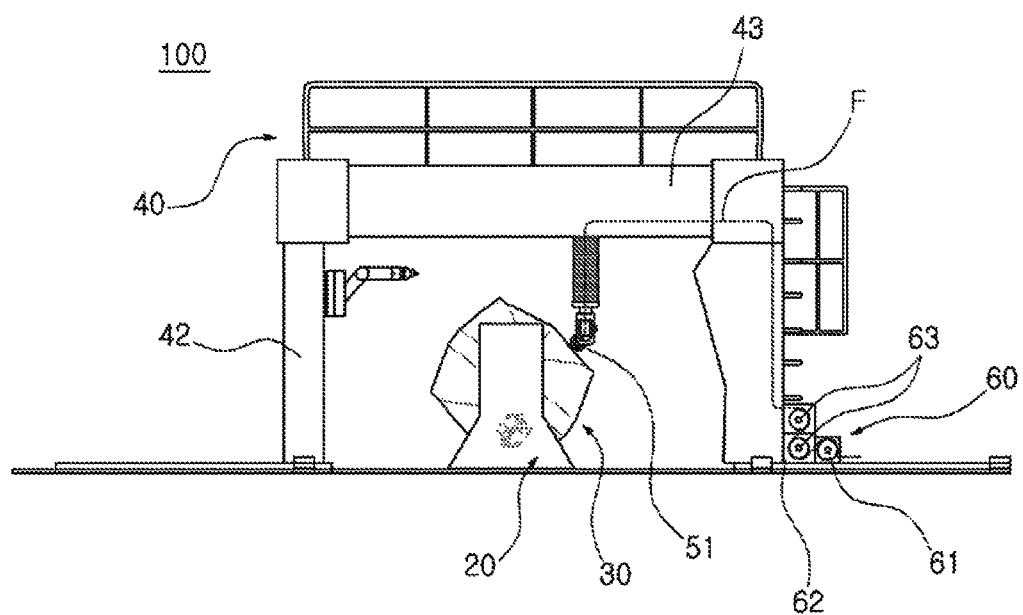
FIG. 2 is a front view illustrating a resin-impregnated fiber being supplied in a high-speed stack molding apparatus utilizing a rotary-type mould according to one embodiment of the present invention.

FIG. 2 is a front view illustrating the resin-impregnated fiber being supplied in the high-speed stack molding apparatus utilizing the rotary-type mould according to one embodiment of the present invention.

As shown in FIG. 2, the fiber-reinforced resin supplying unit 60 includes a supplying roller 61, a resin-dipping part 62 and pressure rollers 63. Here, a resin in which the fiber will be dipped to form the fiber-reinforced resin is stored in the resin-dipping part 62. At this time, the fiber-reinforced resin prevents a glass fiber or a carbon fiber arranged at an inner side from being damaged through reinforcing agents which are coupled with each other by the resin, and can distribute a load applied to the material to increase the strength.

In general, a thermosetting unsaturated polyester is mainly utilized as a resin for a hull. Such a thermosetting unsaturated polyester is tangled in the form of a three dimensional net knot through a reaction when heated so that hardens to a chemically and physically stable state. Therefore, it is preferable that the resin-dipping part 62 be provided with a temperature control part to allow a pre-set storage temperature to be maintained so as to prevent the resin stored in the resin-dipping part from hardening.

Specifically, the fiber-reinforced resin supplying unit 60 is connected to the movable driving frame 40 and supplies a fiber F discharged from the supplying roller 61 to the upper frame 43 via the pressure rollers 63 which face each other and are disposed to allow the fiber to pass through the resin-dipping part 62. At this time, it is preferable that a hollow portion be formed in the movable driving frame 40 so that a fiber conveying line for conveying the fiber is formed along the hollow portion. Here, the fiber conveying line may be provided such that fiber conveying line passes the vertical frame 42, the upper frame 43, the articulated robot arm 52 and the stacking head 50.

In other words, the fiber F is wound around the supplying roller 61 and is conveyed to the fiber-reinforced resin supplying unit 60 by rotation of the supplying roller 61. The fiber F is wetted with the resin by dipping the fiber F in the resin accommodated in the resin-dipping part 62. At this time, an arrangement and an orientation of the fiber F are determined according to the usage thereof, and the fiber F may be formed in the form of woven sheet or a unidirectional tape. In addition, the fiber F wetted with the resin in the resin-dipping part is conveyed to the pressure roller 63.

Here, the fiber F passes between the pressure rollers 63 disposed with a pre-set gap and facing each other, and is pressurized by the pressure roller. Therefore, a ratio of the resin with which the fiber F is wetted may be adjusted and pores of the fiber F may be precisely fitted with the resin. For this reason, the resin can be impregnated in the fiber at the pre-set ratio. Of course, the gap between the pressure rollers 63 facing each other corresponds to the above pre-set ratio which is the optimum impregnation ratio of the resin to the fiber F. If the gap between the pressure rollers 63 is small, an amount of the resin impregnated in the fiber is reduced, and if the gap between the pressure rollers is large, an amount of the resin impregnated in the fiber may be increased.

For this reason, the fiber-reinforced resin stacked on an outer circumferential surface of the multi-mould 30 is molded at a uniform ratio so that the fiber-reinforced resin can be stacked to have the same strength characteristic. Thus, since a layer having uniform thickness is formed to prevent an external force applied to a hull from being concentrated, the strength of molded article can be considerably enhanced.

Meanwhile, the stacking head 50 includes a stacking-head pressure roller 51 for guiding application of the supplied fiber-reinforced resin along an outer circumferential surface of the multi-mould 30 and pressurizes the fiber-reinforced resin to allow the fiber-reinforced resin to be uniformly attached.

Here, a hollow portion is formed in the pressure stacking-head roller 51, and a heating part is disposed in the hollow portion for heating the stacking-head pressure roller 51 to the pre-set temperature or more to harden the stacked fiber-reinforced resin. In addition, it is preferable that the articulated robot arm 52 driving the stacking head 50 be configured with five (5) axes.

At this time, the fiber-reinforced resin is inexpensive, a process condition for hardening the fiber-reinforced resin is easily controlled, and it is possible to include an unsaturated polyester resin having excellent strength in the fiber-reinforced resin. When heated the unsaturated. polyester resin also causes the exothermic reaction so that the unsaturated polyester resin hardens and its molecular arrangement structure has the shape of the three dimensional net knot.

Here, due to bubbles generated when the unsaturated polyester resin hardens, pores may be formed on a surface and inside of the structure after the article hardens, which may cause deterioration of the strength and surface quality of the structure.

The stacking-head pressure roller 51 guides the fiber-reinforced resin supplied according to an operation of the articulated robot arm 52 to the multi-mould 30 to allow the fiber-reinforced resin to be stacked on an outer circumferential surface of the multi-mould. The pressure roller pressurizes the stacked portion to flatten the fiber-reinforced resin placed on a surface of the multi-mould 30 to a uniform thickness and then attach it to a surface of the multi-mould. At this time, a rotational shaft of the stacking-head pressure roller 51 may be connected to a rotation supporting arm, which is connected to an end portion of the articulated robot arm 52 to allow the rotation supporting arm to be rotated vertically.

Therefore, an outer circumferential surface of the stacking-head pressure roller 51 having the rotational shaft connected to the rotation supporting arm is rotationally slid on a surface of the multi-mould to vertically pressurize a surface of the multi-mould on which the fiber-reinforced resin is stacked, while the horizontal movement of the pressure roller can be smoothly performed.

Therefore, the stacking-head pressure roller 51 planarizes the fiber-reinforced resin guided to and stacked on an outer circumferential surface of the multi-mould 30 to mold the fiber-reinforced resin with the uniform thickness. As a result, it is possible to prevent the strength of fiber-reinforced resin from being lowered by a concentration of external force.

In addition, the heating part heats the stacking-head pressure roller 51 to heat and harden the stacked fiber-reinforced resin. At this time, it is preferable that the pre-set temperature of the stacking-head pressure roller 51 heated by the heating part correspond to a hardening temperature of the fiber-reinforced resin. For example, if the hardening temperature of the fiber-reinforced resin is 70° C., the pre-set temperature of the pressure roller may be 70 to 75° C. In a general case, of course, hardening of the fiber-reinforced resin is performed at a temperature which is approximately 90% of the hardening temperature. Therefore, the above pre-set temperature may be greater than or equal to a substantial hardening temperature of 63° C.

In other words, the fiber-reinforced resin is stacked, and simultaneously heated and pressurized by the stacking-head pressure roller 51 so that bubbles that form when the fiber reinforced resin hardens can be smoothly released to an outside to enhance a surface quality and the strength of the molded article after hardening. Furthermore, since the stacking-head pressure roller 51 is heated to a temperature corresponding to the resin and hardens the fiber-reinforced resin at the time of stacking the fiber-reinforced resin, it is possible to reduce a drying time so that the productivity of the molded article can be significantly enhanced.

Furthermore, once the fiber-reinforced resin is simultaneously stacked in the spiral shape and hardens, the stacking head 50 can additionally stack the fiber-reinforced resin in a direction opposite to the spiral direction of the fiber-reinforced resin which was already stacked, by a combination of rotation of the multi-mould 30 and forward/rearward movement of the movable driving frame 40. Thus, the concentric fiber-reinforced resin with different inclination can be stacked on a spiral-shaped stacking surface of the fiber-reinforced resin to further improve the strength of the stacking surface of the fiber-reinforced resin.

In a state in which the pressure roller is in close contact with an outer circumferential surface of the multi-mould, the fiber-reinforced resin is supplied to and stacked on an entire outer circumferential surface of the multi-mould in the spiral shape by a combination of rotation of the multi-mould and forward/rearward movement of the movable driving frame, and thus the fiber-reinforced resin can be stacked and molded with uniform thickness to enhance a quality of the molded article.

Figure 3:
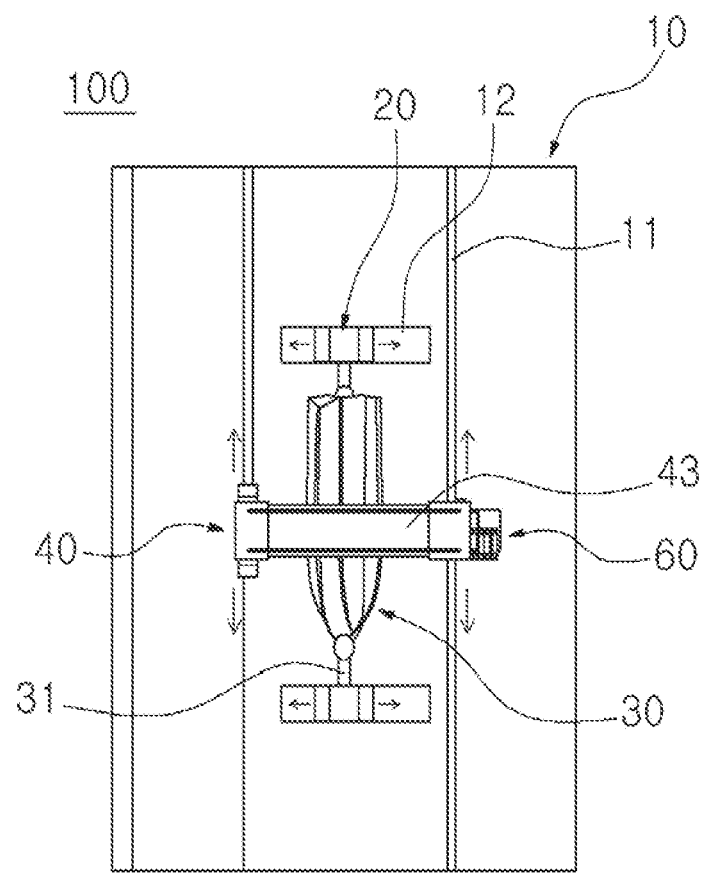
FIG. 3 is a planar view of a high-speed stack molding apparatus utilizing a rotary-type mould according to one embodiment of the present invention.
Figure 4A:
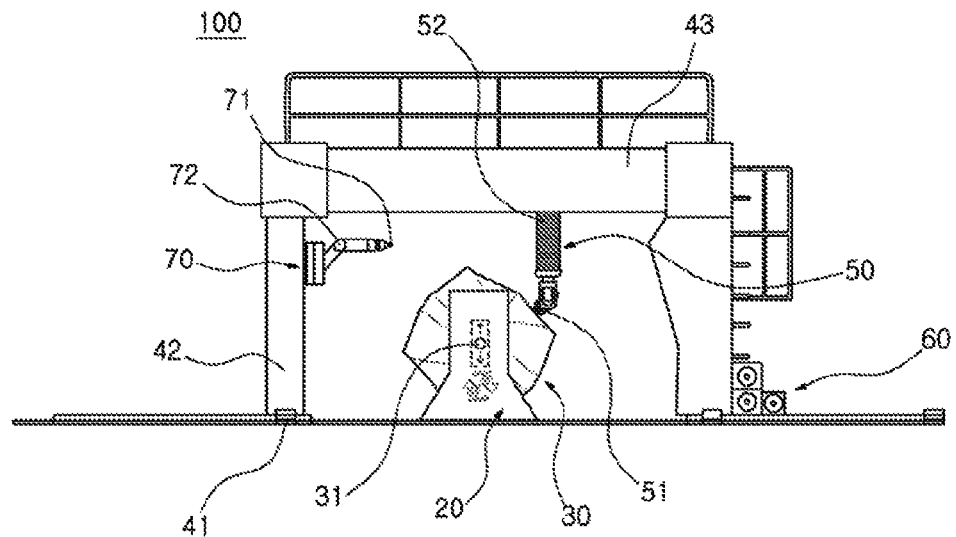
FIG. 4A and FIG. 4B are front views showing operation of a high-speed stack molding apparatus utilizing a rotary-type mould according to one embodiment of the present invention.
Figure 4B:
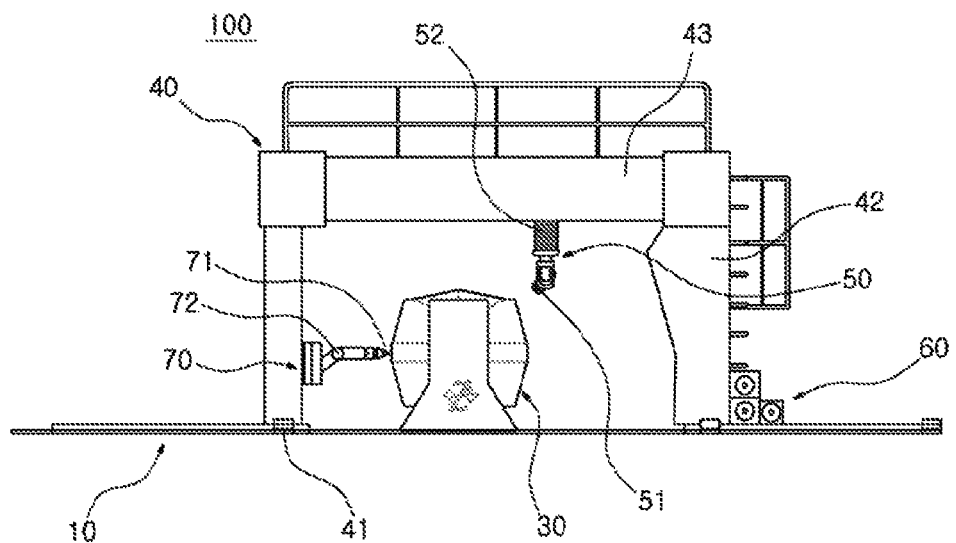
Figure 5:
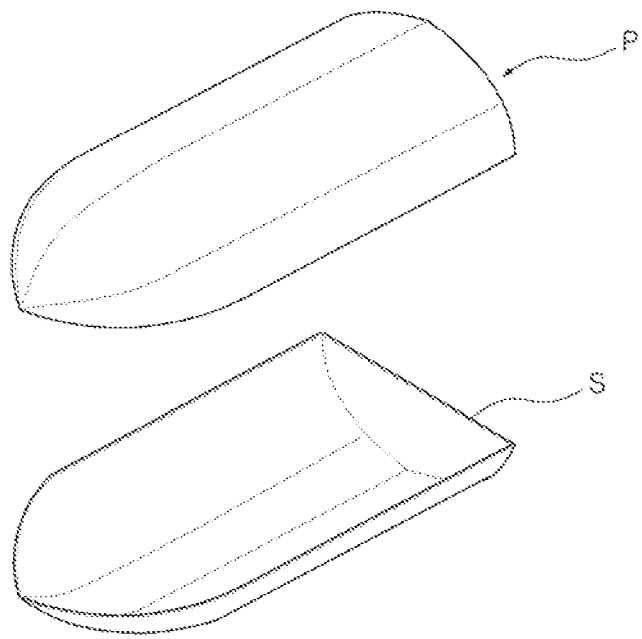
FIG. 5 is a perspective view of a structure manufactured by a high-speed stack molding apparatus utilizing a rotary-type mould according to one embodiment of the present invention.

FIG. 3 is a planar view of a high-speed stack molding apparatus utilizing a rotary-type mould according to one embodiment of the present invention, FIG. 4A and FIG. 4B are front views showing an operation state of a high-speed stack molding apparatus utilizing a rotary-type mould according to one embodiment of the present invention, and FIG. 5 is a perspective view of a structure manufactured by a high-speed stack molding apparatus utilizing a rotary-type mould according to one embodiment of the present invention.

As shown in FIG. 3 to FIG. 5, once the stacking head 50 is located at a starting point of stack molding process on the multi-mould 30, the high-speed stack molding apparatus 100 supplies the resin-impregnated fiber to the stacking head 50 through the fiber-reinforced resin supplying unit 60.

The fiber-reinforced resin discharged to the stacking head 50 is stacked on an outer circumferential surface of the multi-mould 30, and pressurized and heated by the stacking-head pressure roller 51 so that the fiber-reinforced resin can be placed on the multi-mould and can harden. In addition, the multi-mould 30 is rotated, and as the movable driving frame 40 is moved forward/rearward, the fiber-reinforced resin is stacked and molded on the entire outer circumferential surface of the multi-mould 30 in the spiral shape.

Referring to FIG. 4A, both end portions of the multi-mould 30, which are connected to each other by the rotational shaft 31, can be moved upward/downward on the mould-rotating units 20 within a distance from a center of rotation of the multi-mould 30 to an outer circumferential surface profile.

Furthermore, since the stacking head 50 can be moved by the articulated robot arm 52 along an outer circumferential surface profile of the multi-mould 30, it is possible to mold the stacked fiber-reinforced resin having the uniform thickness. In addition, since the fiber-reinforced resin can be precisely stacked on a complex outer circumferential surface of the multi-mould 30, a quality of the molded article can be enhanced.

In addition, since the mould-rotating units 20 can be laterally moved along the moving rail 12 to adjust an arrangement angle of the multi-mould 30, it is possible to precisely stack the fiber-reinforced resin to match various shapes of the multi-mould 30.

Meanwhile, referring to FIG. 4B, if the fiber-reinforced resin is stacked and molded and hardens on an entire outer circumferential surface of the multi-mould 30, the hardened fiber-reinforced resin is cut by a cutting part 70 to separate the fiber-reinforced resin from the multi-mould 30.

Here, the cutting part 70 includes a position-adjusting arm 72 and a knife 71. At this time, the position-adjusting arm 72 is connected to an inner side surface of the vertical frame 42 and can be selectively moved upward and downward so that an end portion of the position-adjusting arm is selectively advanced to or retreated from an outer circumferential surface of the multi-mould 30.

More specifically, the position-adjusting arm 72 can be moved in the longitudinal direction of the multi-mould 30 according to forward/rearward movement of the movable driving frame 40, and can be moved upward/downward along an inner side surface of the vertical frame 42 in the vertical direction of the multi-mould 30.

In addition, since the position-adjusting arm 72 is operated such that the end portion is advanced to or retreated from an outer circumferential surface of the multi-mould 30 according to folding and unfolding of a joint region provided therein, the end portion of the position-adjusting arm 72 can be moved together with rotation of the multi-mould 30 to cover an entire outer circumferential surface of the multi-mould 30. Therefore, the knife 71 provided at the end portion can be disposed to come in contact with a location at which a cutting process is required.

Also, the knife 71 is provided at the end portion and vibrates at a high speed by means of ultrasonic waves to cut the hardened fiber-reinforced resin into each hull profile according to operations of the movable driving frame 40 and the position-adjusting arm 72. At this time, it is preferable that the knife 71 vibrate at the speed of 40,000 cycles or more per second or more to clearly cut the hardened fiber-reinforced resin without damage.

More specifically, referring to FIG. 5, since the multi-module 30 is formed to have a plurality of hull profiles facing each other, once the knife 71 is moved along the facing surfaces S of the hull profiles to cut the fiber-reinforced resin, the structures P, each having a hull profile, can be separated from the multi-mould 30 and manufactured.

As described above, since the plurality of hull profiles formed on the entire outer circumferential surface of the multi-mould 30 can be cut by cutting the facing surfaces S according to each hull profile to produce a plurality of structures P at one time, the productivity of the molded article can be significantly enhanced.

FIG. 5 illustrates that a vertical face is formed at a rear portion of the structure P. However, it is preferable that, like a front portion having a streamlined shape, a rear portion of the structure P be formed with a streamlined shape and be cut vertically, and that a vertical part be additionally attached to a cut portion (opening).

Meanwhile, referring to FIG. 4A, both ends of the multi-mould 30 are selectively moved upward/downward according to a distance between a center of rotation and an outer circumferential surface profile of the multi-mould 30 so that the stacking head 50 comes in contact with the outer circumferential surface of the multi-mould 30.

In other words, although the rotational shall 31 of the multi-mould 30 is coupled with the mould-rotating units 20, the rotational shaft 31 is provided to be selectively moved in the vertical direction of the mould-rotating units 20 to move the multi-mould 30 upward/downward.

Specifically, the control unit can calculate a distance between a center of rotation of the multi-mould 30 and the outer circumferential surface profile based on the information on the shape of the multi-mould 30, which consists of three-dimensional coordinate. Thus, the robot arm 52 is moved upward/downward by control of the control unit according to the distance between a center of rotation of the multi-mould 30 and the outer circumferential surface profile.

Of course, the multi-mould 30 may be moved upward/downward by control of the control unit according to the distance between a center of rotation of the multi-mould 30 and the outer circumferential surface profile, so that it is possible to precisely stack the fiber-reinforced resin without an outer circumferential surface deviating from a moving range of the articulated robot arm 52.

Therefore, if a size of the multi-mould 30 is large, by moving the rotational shaft 31 upward, the multi-mould 30 can be merely smoothly rotated. On the other hand, if a size of the multi-mould 30 is small, by moving the rotational shaft 31 downward toward the stacking head 50, it is possible to precisely stack and mold the fiber-reinforced resin on entire outer circumferential surface of the multi-mould 30.

Likewise, both ends of the multi-mould 30 are selectively moved upward/downward according to a dimension of the multi-mould 30. Therefore, the articulated robot arm 52, the movable driving frame 40 and the mould-rotating units 20 can be controlled in an interlock way so that the stacking head 50 conies in more precise contact with the outer circumferential surface of the multi-mould 30. Thus, the degree of stacking precision of the article can be enhanced and it is possible to stack and mold the stacking precision on multi-moulds 30 of various sizes so that compatibility of the article can be enhanced.

Through the above technical solutions, the high-speed stack molding apparatus utilizing a rotary-type mould of the present invention provides the following effects.

First, since the stacking head supplies and stacks the fiber-reinforced resin on an entire outer circumferential surface of the multi-mould in the spiral shape with a combination of rotation of the multi-mould and forward/rearward movement of the movable driving frame in a state in which the stacking head is in close contact with the outer circumferential surface of the multi-mould, the fiber-reinforced resin can be stacked with a constant thickness to enhance a quality of an article.

Second, since a plurality of hull profiles are disposed on an entire outer circumferential surface of the multi-mould and face each other in the lateral direction or along a vertical central surface, once the fiber-reinforced resin is cut by the cutting part along a facing face after stacking and molding the fiber-reinforced resin on an outer circumferential surface, a plurality of structures each having a hull profile can be manufactured by only one molding process to significantly enhance the productivity of the article.

Third, the fiber discharged from the supplying roller is wetted with a resin in the resin-dipping part and then passes between the pressure rollers facing each other with a pre-set gap, and the fiber is pressurized by the pressure rollers so that the fiber is impregnated with the resin at a pre-set ratio. As a result, the fiber-reinforced resin stacked on the multi-mould is molded at a uniform ratio to prevent the external force from being concentrated and to significantly enhance the strength of the molded article.

Fourth, since the pressure rollers of the stacking head pressurize and planarize the fiber-reinforced resin guided to and stacked on the outer circumferential surface of the multi-mould, the molded layer having uniform thickness can prevent deterioration of the strength caused by a concentration of external force. Furthermore, since the pressure rollers are heated to a temperature corresponding to that of the resin so that stacking and hardening of the fiber-reinforced resin are simultaneously performed, although a drying time is reduced, internal bubbles can be smoothly released to significantly enhance the productivity and quality of molded article.

It will be apparent to those skilled in the art that various modifications can be made to the above-described exemplary embodiments of the present invention without departing from the spirit or scope of the invention. Thus, the present invention is intended to cover all such modifications provided they come within the scope of the appended claims and their equivalents.

What is claimed is:

1. A high-speed stack molding device utilizing a rotary multi-mould, comprising;

a base having a pair of first moving rails formed on an upper surface thereof along a first direction and a pair of second moving rails formed on the upper surface of the base along a second direction perpendicular to the first direction and arranged between the pair of first moving rails;

a pair of mould-rotating units movably disposed on the pair of second moving rails on the upper surface of the base and supporting both ends of a multi-mould, the multi-mould having a plurality of hull profiles formed along an entire outer circumferential surface thereof, the pair of mould-rotating units being movable in a same direction or in opposite directions along the second direction to adjust an alignment angle of the multi-mould, wherein the multi-mould is connected to a rotational shaft which is arranged perpendicular to the second direction and selectively rotated by a driving motor, wherein the plurality of hull profiles are symmetrically disposed along at least one of a longitudinal central surface and a vertical central surface of the multi-mould;

a movable driving frame including vertical frames extending upward from slide-coupling parts, which are movable forward and rearward along the first direction on the pair of first moving rails and an upper frame connecting upper end portions of the vertical frames to cover an upper portion of the multi-mould, wherein an inner portion of each vertical frame faces the multi-mould;

a fiber-reinforced resin supplying unit comprising a supplying roller, a resin-dipping part, and pressure rollers, the fiber-reinforced resin supplying unit connected to an outer portion of at least one of the vertical frames and supplying a fiber discharged from the supplying roller to a first vertical frame being connected to the fiber-reinforced resin supplying unit and the upper frame through the pressure rollers, the pressure rollers facing each other and disposed to allow the fiber to pass through the resin-dipping part;

a stacking head directly connected to an end portion of an articulated robot arm connected operably to the upper frame, wherein a fiber-reinforced resin which is supplied through the fiber-reinforced resin supplying unit is pressurized and stacked via the stacking head on an outer surface of the multi-mould;

a fiber conveying line conveying the fiber and formed in the movable driving frame, the fiber conveying line passing through the first vertical frame, the upper frame, the articulated robot arm, and the stacking head;

a position-adjusting arm including a coupling part installed at an inner side surface of a second vertical frame opposite to the first vertical frame and movable upward and downward along the second vertical frame, and an extension part connected to the coupling part by a joint and being foldable with respect to the coupling part about the joint; and a knife installed at the end portion of the extension part and configured to cut at least one of the longitudinal central surface and the vertical central surface of the multi-mould to produce each hull profile from the plurality of hull profiles.

2. The high-speed stack molding device utilizing a rotary multi-mould of claim 1, wherein the stacking head comprises a stacking-head pressure roller which guides the supplied fiber-reinforced resin along the outer circumferential surface of the multi-mould, and pressurizes and attaches the fiber-reinforced resin to the outer circumferential surface of the multi-mould.

3. The high-speed stack molding device utilizing a rotary multi-mould of claim 2, wherein the stacking-head pressure roller comprises a hollow portion and a heating part disposed in the hollow portion to heat the stacking-head pressure roller to a pre-set temperature or more in order to harden the stacked fiber-reinforced resin.

4. The high-speed stack molding device utilizing a rotary multi-mould of claim 1, wherein the articulated robot arm is moved in one direction to allow the stacking head to come in contact with the outer circumferential surface of the multi-mould evenly according to the pre-set outer circumferential surface profile of the multi-mould.

5. A high-speed stack molding device utilizing a rotary multi-mould, comprising;
- a base having a flat upper surface, a pair of first moving rails formed on the flat upper surface along a first direction, and a pair of second moving rails formed on the flat upper surface along a second direction perpendicular to the first direction and arranged between the pair of first moving rails;
- a multi-mould having a plurality of hull profiles formed along an entire outer circumferential surface thereof,
- wherein the plurality of hull profiles are symmetrically disposed along at least one of a longitudinal central surface and a vertical central surface of the multi-mould;
- a pair of mould-rotating units movably disposed on the pair of second moving rails on the flat upper surface of the base and supporting both ends of the multi-mould, the pair of mould-rotating units being movable in a same direction or in opposite directions along the second direction to adjust an alignment angle of the multi-mould,
- wherein the multi-mould is connected to a rotational shaft which is arranged perpendicular to the second direction and selectively rotated by a driving motor;
- a movable driving frame including vertical frames extending upward from slide-coupling parts movable on the pair of first moving rails, and an upper frame connecting upper ends of the vertical frames;
- a fiber-reinforced resin supplying unit comprising a supplying roller, a resin-dipping part, and pressure rollers, the fiber-reinforced resin supplying unit connected to at least one of the vertical frames and supplying a fiber discharged from the supplying roller to the upper frame of the movable driving frame through the pressure rollers, the pressure rollers facing each other and disposed to allow the fiber to pass through the resin-dipping part;
- a robot arm connected to the upper frame of the movable driving frame, which is capable of moving forward/rearward along the first moving rails disposed on the flat upper surface of the base, an end portion of the robot arm moving in one direction according to a pre-set outer circumferential surface profile of the multi-mould;
- a stacking head directly connected to an end portion of the robot arm, and pressurizing and stacking the fiber-reinforced resin, which is supplied through the fiber-reinforced resin supplying unit, on an outer surface of the multi-mould;
- a fiber conveying line conveying the fiber and formed in the movable driving frame, the fiber conveying line passing through a first vertical frame among the vertical frames, the upper frame, the robot arm, and the stacking head;
- a position-adjusting arm including a coupling part installed at an inner side surface of a second vertical frame opposite to the first vertical frame and movable upward and downward along the second vertical frame, and an extension part connected to the coupling part by a joint and being foldable with respect to the coupling part about the joint; and
- a knife installed at the end portion of the extension part and configured to cut the multi-mould to produce each hull profile from the plurality of hull profiles.

* * * * *